United States Patent [19]
Senfe et al.

[11] 3,887,474
[45] June 3, 1975

[54] PROCESS FOR PRODUCING A FILLER FOR DRILLING MUD

[75] Inventors: Heinz Senfe, Cologne-Stammheim; Artur Bergmann, Lennestadt; Gerhard Dam, Stommeln; Dieter Menzel, Rheinkamp-Baerl, all of Germany

[73] Assignee: Metallgesellschaft Aktiengesellschaft, Frankfurt am Main, Germany

[22] Filed: Aug. 3, 1972

[21] Appl. No.: 277,659

[30] Foreign Application Priority Data
Aug. 10, 1971 Germany.............................. 2139952
June 22, 1972 Germany.............................. 2230510
June 23, 1972 Germany.............................. 2230908
June 21, 1972 Germany.............................. 2230272

[52] U.S. Cl................ 252/8.5 B; 423/150; 423/633
[51] Int. Cl............................................... C09k 3/00
[58] Field of Search........... 252/8.5 B; 423/150, 633

[56] References Cited
UNITED STATES PATENTS
1,991,637 2/1935 Harth................................ 252/8.5 B
2,276,075 3/1942 Wuensch.......................... 252/8.5 B
2,298,984 10/1942 Stinson et al..................... 252/8.5 B
2,455,188 11/1948 Oxford............................. 252/8.5 B

*Primary Examiner*—Benjamin R. Padgett
*Assistant Examiner*—B. Hunt
*Attorney, Agent, or Firm*—Karl F. Ross; Herbert Dubno

[57] ABSTRACT

A process for producing a filler for upgrading drilling fluid, especially for supporting the strata of deep drill holes or bores of the type used for oil and subsurface exploration, comprises the steps of comminuting a sulfur-containing iron mineral which is roasted to a sulfur content of less than 2 percent by weight, neutralizing the comminuted product upon dispersion thereof in water, leaching soluble components from the material and drying the same. The oxidic roasted product is classified to a particle size below 75 microns and a particle size distribution such that no more than 50 percent (preferably less than 30 percent) is below a particle size of 10 microns. Preferably, the composition is classified in the following particle size distribution: 50–55 percent of a particle size between 30 and 75 microns, 10–15 percent of a particle size between 20 and 30 microns, 10–15 percent between 10 and 20 microns, and 20–30 percent in a particle size up to 10 microns.

9 Claims, 1 Drawing Figure

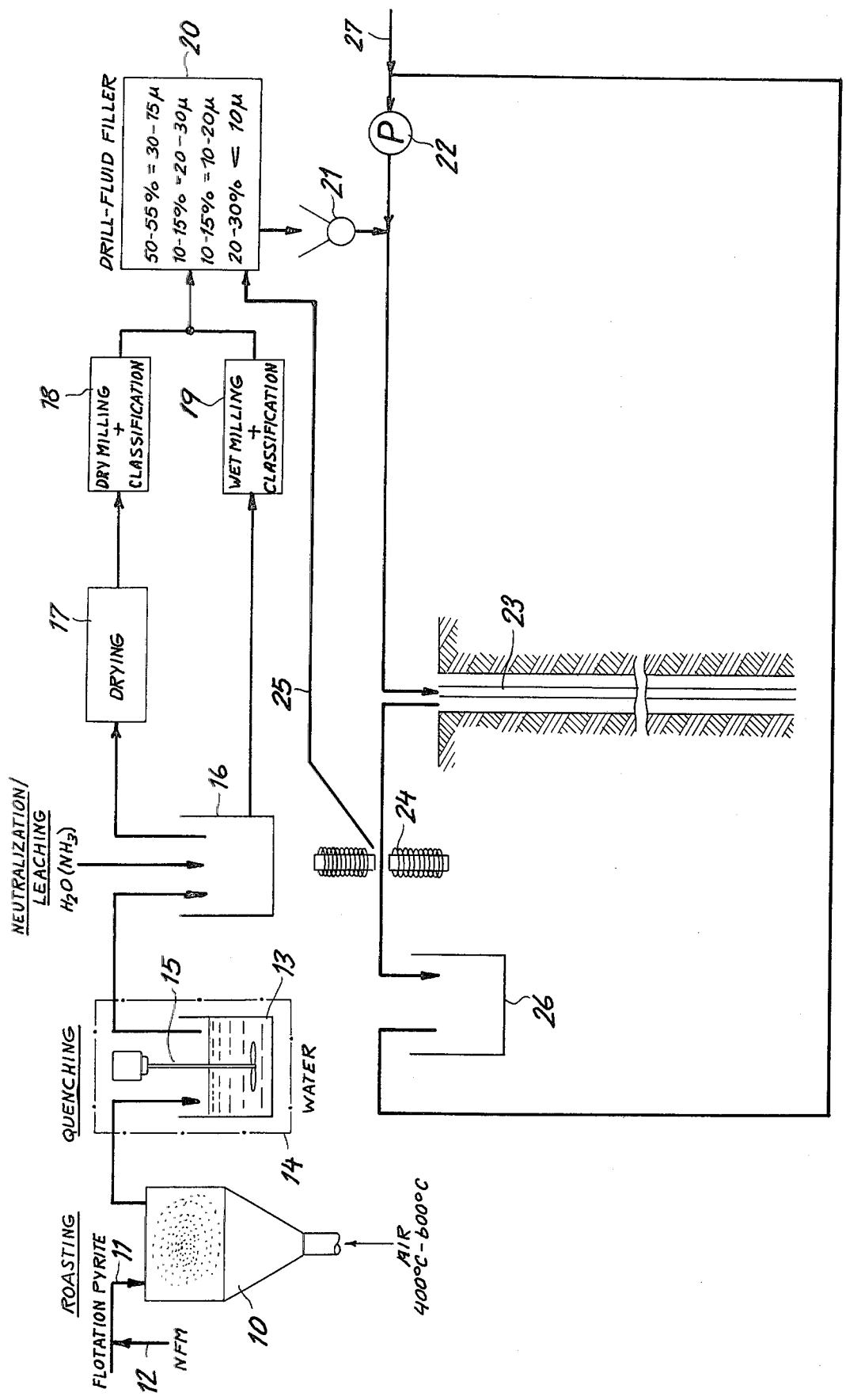

PROCESS FOR PRODUCING A FILLER FOR DRILLING MUD

FIELD OF THE INVENTION

Our present invention relates to fillers for drilling fluids and, more particularly, to a process for producing a filler or additive to drilling fluids (drilling mud).

BACKGROUND OF THE INVENTION

Drilling fluid for deep bore drilling, e.g., in the exploration of oil or other sub-surface strata may make use of drilling fluids, generally containing particles to form a drilling mud, for lubricating and cooling the drill, for supporting the strata traversed by the bore and supporting the wall of the drilled cavity. The importance of the fillers introduced into drilling fluids, which may be used to drive turbine-type drills and may serve as a coolant and a liquid for removal of detritus, is that they increase the specific gravity of the drilling fluid and thus improve its properties as a wall-supporting medium.

It is known to select additives or fillers for drilling fluids and drilling mud so as to increase specific gravity with relatively small quantities of the filler. The filler generally should have a high intrinsic density, should be able to increase the specific gravity of the drilling mud by its addition in small quantities, and should provide a composition which has minimal thixotropy. When the filler imparts thixotropic properties to the drilling fluid, the fluid becomes difficult to pump and circulate through the bore and is, consequently, undesirable. High-viscosity thioxotropic fluids can be produced by the addition of some fillers to the liquid, thereby reducing the rate of advance of the drill and drilling progress. It is also important that the additive or filler supplied in particulate form to the drilling fluid not substantially reduce the ability of the latter to extract the detritus from the region of the drill bit. Also, the filler should not form dense filter deposits, upon loss of liquid from the bore and should have minimal abrasive properties so as to avoid abrading the wall of the bore or the drilling string. Finally, the additive must not render the drilling fluid capable of chemical attack upon the subsoil strata or the drill string.

It has been proposed to provide fillers for drilling fluids and drilling muds which consist of natural barium sulfate (heavy spar) having a specific gravity of about 4.2 As modern drilling is carried out to increasing depths, the need increases for a completely satisfactory filler for the drilling fluid which should have a specific gravity in excess of or approaching 2.0. The naturally-occurring barium sulfate is able to fulfill the requirements only when various disadvantages are disregarded. For example, the use of this mineral increases the viscosity of the drilling fluid, can be prepared in a form suitable for incorporation in the drilling fluid only at considerable expense and generally is unsatisfactory except for its contribution to the specific gravity of the drilling mud.

Other solutions to the problem have included the addition of iron-oxide substances, such as hematite, magnetite or even comminuted rolling-mill scale with specific gravities of up to 5.2. These materials can be used as fillers for drilling mud only at higher costs than are the case with natural barium sulfate and with disadvantages from the technical point of view. For example, the use of such fillers yields a drilling mud with a tendency towards sedimentation and excessive abrasion.

It has been proposed, moreover, to make use of roasted sulfidic iron ores as fillers for drilling muds. The high total sulfur content of the product subsequent to roasting, however, makes it necessary to subject the iron ores to a chloridizing roasting at temperatures of about 1000°C in the presence of alkali metal salts. The system is similar to a fused-salt technique and the product must be wet milled and leached to remove undesirable components. It is generally found that the filler contains varying amounts of gangue-like substances so that it is difficult to provide uniformly high specific gravities in reproducible batches of the latter product.

OBJECTS OF THE INVENTION

It is the principal object of the present invention to provide an improved method of making a high specific gravity filler for drilling fluids and drilling muds whereby the aforementioned disadvantages are obviated.

It is another object of the invention to provide a method of reproducively producing a filler having a specific gravity in excess of 4.7 for drilling muds which will not materially increase its viscosity, will increase the specific gravity of the drilling fluid with addition of small quantities of the filler, has low abrasion characteristics, does not tend to sediment from the drilling fluid and cake, and is of relatively low cost.

Still another object of the invention is to provide an improved filler for the purposes described.

DESCRIPTION OF THE INVENTION

We have found, most surprisingly, that these objects can be obtained with a filler having a composition similar to that last described wherein, however, the fused-salt treatment can be avoided and the iron-based roasted substance is comminuted to a limited particle size range, namely, to a particle-size distribution in which all of the particles have a particle size of at most 75 microns and the particle size component below 10 microns does not exceed 50 percent, preferable being less than 30 percent.

More specifically, the invention provides a method of producing a filler for drilling fluids and drilling muds, especially deep-drilling fluids, which comprises the steps of finely comminuting a roasted sulfur-containing iron-based mineral having a total sulfur content below 2 percent, dispersing the finely divided material in water and neutralizing the resulting dispersion, washing or leaching soluble components from the mineral and finally drying the mineral product. The invention also comprises the essential step of classifying the iron-oxide roasted product to a particle size below 75 microns for the product of interest as a filler for drilling muds whereby the particle size fraction below 10 microns does not make up more than 50 percent and preferably not more than 30 percent of the composition used as the filler.

We have also found that optimum results are obtained with a filler having a particle size distribution within well-defined boundaries as follows:

50–55 percent with a particle size range from 30–75 microns

10–15 percent with a particle size range of 20–30 microns

10–15 percent with a particle size range from 10–20 microns, and

20–30 percent with a particle size range up to 10 microns.

It has been found that with this particle size range, large quantitites of the filler can be added to the drilling fluid without significant sedimentation or increase in the viscosity or thixotropy of the drilling fluid.

We have also found, moreover, that a high-quality filler is produced when the iron-oxide product is, from the roasting temperature, quenched in water at a temperature below 100° C by rapidly dumping the roasted iron-oxide product into water, the quenching being followed immediately by a leaching and washing process to eliminate soluble substances. Preferably, the quenching is carried out in such manner that the roasted product has a temperature of at least 200° C. In general, the temperature of the roasted product exceeds 350° C and usually is in the range of 400°–600° C, the roasted product being quenched from this temperature.

The water quantity for the quenching process is so selected that after quenching, the mineral product is obtained in the form of an aqueous acid slurry. It is, moreover, important for the purposes of the present invention that the quenching be rapid and with exclusion of air or other oxidizing atmosphere from the mineral product during quenching. The quenching slurry is thus stirred in such manner as to prevent the introduction of atmospheric air into it. Quenching may thus be affected in the presence of a non-oxidizing atmosphere, e.g., of nitrogen.

It appears that the exclusion of oxygen during the quenching process prevents oxidation of polyvalent metal to the higher oxidation states thereof. The salts of such polyvalent metal thus remain in the lower oxidation state in which they are more readily leached as soluble salts from the mineral. Metal salts with higher oxidation states, such as the iron-III-sulfate, cannot be readily removed by leaching because of their low solubility. The salts which are leached from the mineral include the iron-II-sulfate when oxygen is excluded during quenching. It should be noted that the elimination of such salts is important to avoid subsequent hydrolytic reaction which, in turn, bring about acidic attack within the drilling fluid. For example, when the drilling fluid is generally basic, the reaction may involve the formation of the low-solubility metal hydroxides which detrimentally effect the rheological properties of the drilling fluid.

While the particular mineral substance used as the raw material for the purposes of the present invention has not been found to be critical, we prefer to make use of iron pyrites and preferably those obtained by flotation. In general, however, mineral substances containing iron and sulfur and which form iron oxide upon roasting may be employed. The total sulfur content of the roasted product should be no greater than 2 percent by weight, although a maximum of 1.5 percent by weight is preferred with best results being obtained with sulfur contents below 1 percent by weight. For the maximum effectiveness of the filler, the sulfur content should not be more than 0.9 percent by weight.

Amoung the starting materials which fulfill these requirements are the preferred flotation pyrites, pyrrhotite, markasite, iron sulfate or mixtures of iron sulfides and iron sulfates.

Optimum results are obtained with roasted products of flotation pyrites having the following composition: 85–95 percent by weight $Fe_2O_3$, 7 percent by weight $SiO_2$, 1.5 percent by weight $Al_2O_3$, 0.4–0.9 percent by weight total sulfur, 3.6 percent by weight water-soluble components, specific gravity 4.5 and pH value in aqueous slurry 2.9.

It has also been found that the roasting process can be carried out in various apparatus and in various ways, without critical effect upon the quality of the filler eventually produced. More particularly, the roasting may be carried out in rotary-tube kilns, platform furnaces, pan or other conventional roasting furnaces. Best results are obtained from an economical point of view when the roasting is carried out in a fluidized bed.

We have also discovered that best results are obtained with a filler made from a roasted product which contains nonferrous metals. Preferably, the roasted product prior to comminution contains lead, zinc, copper or nickel in a total amount for all of the metal and calculated as elemental metal, of 0.05–10 percent by weight. Preferably, the nonferrous metal content lies between 0.05 and 6 percent by weight and best results are obtained with a metal content of 0.05–2 percent by weight of lead and/or zinc. A total nonferrous metal content of 0.05–2 percent by weight has been found to yield good results.

The nonferrous metals appear to enter the crystal lattice of the iron oxide as inclusions or the like and for reasons which are not fully understood, markedly improve the technological properties of the filler.

It is thus contemplated, in accordance with the present invention, when the roasted product contains no nonferrous metal to supply within the range of 0.05–10 percent by weight one or more of the group of lead, zinc, copper or nickel. When addition of sulfide is found to be advantageous during the roasting step, the metals copper, nickel, lead or zinc individually or together can be incorporated into the raw material in the form of their sulfides. These metals may be individually mixed with finely divided iron sulfide or sulfidic ores containing these metals in appropriate quantity can be mixed with the finely divided iron sulfide, the mixture being then combined with iron sulfate containing materials and subjected to the roasting process.

In a similar manner the nonferrous metal content of naturally-occurring sulfidic iron-based minerals can be increased. Thus, the nonferrous metal sulfides or sulfidic ores of the nonferrous metals can be combined with the sulfidic iron ore. Suitable additives to the latter thus include galena, zinc blende, copper pyrites, chalcocite or nickeliferous pyrrhotite.

In the foregoing cases, finely divided sulfides of the nonferrous metals may be intimately mixed with the finely divided sulfidic iron carrier and the mixture subjected to a glomeration, preferably using as the agglomerating liquid an iron-sulfate solution. The agglomerate, either in the form of pellets or briquettes, can then be roasted. So-called complex ores can also be used with advantages for the preparation of the filler according to the invention. Such complex ores may include flotation pyrites which originally had excessive quantities of the nonferrous metal which were removed prior to roasting as a gangue during the flotation process.

The roasted product is quenched from the roasting temperature directly in water in the absence of air and the resulting acidic suspension is then subjected for a period of 15-60 minutes, direcly after quenching, to stirring to leach soluble material from the mineral mass. The aqueous phase is then removed and the mineral product washed. In many cases, leaching times of less than 15 minutes are sufficient and seldom it is necessary for the leading time to exceed 1 hour.

The washed mineral product can be treated in a number of ways to obtain the classified product according to the present invention. For example, the washed product may be subjected to a wet milling followed by wet classification simultaneously with washing and followed by drying. The product may, however, be dried prior to dry milling and classification. The resulting product, which should have an ironoxide content between 85 and 95 percent, should lie within the particle size distribution ranges given above.

It has been found to be important to carry out the leaching and washing process under such conditions that the washed product no longer gives an acid reaction, i.e., the liquid phase of the last washing is not acidic. If the washing does not suffice, a neutralization step is introduced. Advantageously, the slurry may be drained to form a filter cake which is again slurried in water at a temperature of 80° C and the suspension adjusted to a pH of 7-8 with aqueous ammonia. After a treatment time of 15-60 minutes at 60°C with constant stirring, the solids can be removed and washed. The washed product is then preferably dried to a residual moisture content of about 0.4 percent.

According to another embodiment of the invention, the washed product, with or without prior neutralization, is treated with water-soluble barium compounds such as barium chloride or barium hydroxide which form salts with sulfate ion in the mineral mass. For example, calcium sulfate present in the mass reacts by double displacement to precipitate the barium sulfate which remains in the solid product and is found to have no disadvantageous effect upon the filler when the latter is incorporated in the drilling fluid. The calcium is removed in the form of the hydroxide or chloride. Furthermore, the filler particles, freed from water-soluble components may also be treated with surface-affecting substances include surface-active agents such as tensides, ionic or non-ionic emulsifying agents, triethanolamine or agents which counter the liquid loss from the drilling mud such as sodium carboxymethyl cellulose. These agents increase the dispersibility of the filler in the drilling fluid and can be added during the washing process.

The filler according to the present invention can be used in drilling fluids of substantially any type and preferably with any drilling fluid having a specific gravity up to 1.7 g/cm³. Drilling fluids with which the invention may be used to include fresh water drilling fluids, saltwater fluids, magnesia-based fluids, inhibitor-containing fluids and fluids for special purposes such as oil-based emulsions. Excellent results have been obtained with saltwater drilling fluids having a pH of about 11 and a specific gravity of about 1.2. Such fluids generally are of approximately the following composition:

1,000 parts by weight water, 40 parts by weight bentonite, 30 parts by weight carboxymethyl cellulose, 2 parts by weight thinning agents, 30 parts by weight sodium chloride and 0.75 parts by weight sodium hydroxide.

When 610 grams of the filler according to the present invention is added to a liter of this drilling fluid, the resulting specific gravity is 1.6. By comparison, 650 grams of barium sulphate filler is necessary to reach the same specific gravity. Similar reductions in the amount of filler which must be used apply to higher specific gravities.

The filler is, moreover, readily dispersible in the drilling fluid and, as noted, establishes the desired specific gravity in half the time or one third of the time required when barium sulphate is used. When amounts of barium sulphate equivalent to the filler of the present system for establishing a particular specific gravity are compared with the filler of the instant invention in terms of the effect on viscosity, it is found that the barium sulphate substantially modifies the viscosity of the drilling fluid while the filler of the present invention has little, if any, effect thereon.

Because of the content of nonferrous metal, the particles of the filler of the present invention have substantially reduced abrasive character when compared, for example, with barytes conventionally used in drilling fluids. The operating life of the drill string, drill bit and pumps is thereby increased.

The filler according to the present invention has also been found to have a surprising advantage in its increased effectiveness as a surface active material, e.g., as an adsorbent for sulphur-containing gases in the strata traversed by the bore. The hydrogen sulfide adsorbed by the filler does not alter the specific gravity, although the filler has an indicator-like character in that a color change occurs with such adsorption.

Conventional systems for removing fillers from the drilling fluid, e.g., for reconstituting a drilling fluid free from detritus and contaminants, have hitherto concentrated on cyclone separations whereby the filler was recovered with the detritus of the drilling process. Further separation was difficult, if not impossible. We have found that it is possible to avoid these disadvantages with the filler according to the present invention, which makes use of a strong magnetic field for recovering the filler particles from expended drilling mud.

DESCRIPTION OF THE DRAWING

The above and other objects, features and advantages of the present invention will become more readily apparent from the following description, reference being made to the accompanying drawing in which the sole FIGURE is a diagram illustrating the invention.

SPECIFIC DESCRIPTION

In the drawing, we show a fluidized-bed roaster which is charged with particles of an iron and sulphur containing mineral, e.g., floatation pyrites at 11, after the latter have been mixed with non-ferrous metal at 12, e.g., in the form of the sulfides of these metals. The sulphur-containing mass is roasted with air at a temperature of 400° to 600°C. For a period sufficient to reduce the sulphur content to less than 2 percent by weight and preferably about 0.9 percent by weight, the particles being discharged without cooling from the roasting temperature into a quenching vessel 13. The latter, shown to be provided in a chamber 14 under a non-oxidizing atmosphere includes an agitator 15 for ensuring rapid quenching of the roasted product from a temperature in the range of 400° to 600°C to a temperature below 100°C. The quenching step involves also a leaching of water-soluble components from the solid mass.

The next stage 16 may comprise neutralization in which the solids, after draining of the washing water, are slurried in aqueous ammonia (and/or reacted with a barium salt) to eliminate all traces of acid. Leaching may continue in this stage which is followed by washing and rinsing.

The solid product may then be dried at 17 and subjected to dry milling and classification at 18. Alternatively, the moist solid from stage 16 may be subjected to a wet milling and classification at 19.

The resulting product is the drilling-fluid filler according to the invention which is represented at 20.

The filler may be introduced at 21 into the drilling mud which is circulated by a pump 22 to the drill string 23. The contaminated fluid may be subjected to magnetic separation at 24 to recover the filler particles at 25, the drilling fluid then entering a settling tank or sump 26. The drilling fluid may then be recirculated through the pump or discharged. Fresh liquid can be added to the system as represented at 27.

SPECIFIC EXAMPLES

Example I

Flotation pyrite containing copper, nickel, lead and zinc is roasted in a fluidized bed. 5 kg of the recovered oxidized product, at a temperature of 550°C is directly quenched in 10 liters of water to a temperature of 70°C. The resulting suspension is agitated for 30 minutes and the solid face is then separated from the liquid face by filtering and centrifugation. The solid mass is washed with 15 liters of heated water and filtered, the filter cake being suspended in 4 liters of water. This slurry is treated with 30 grams of barium hydroxide and is milled in a ball mill. The product discharged from the ball mill is filtered, washed, dried and classified to yield the product of the following particle size ranges.

54 percent = 30 to 75 microns
11 percent = 20 to 30 microns
13 percent = 10 to 20 microns
23 percent = up to 10 microns The properties of this filler for drilling mud are set forth in Table I. The filler is found to have a substantially constant and neutral pH over long periods. When the process is repeated using platform-type or rotary-tube furnaces for the roasting step similar results are obtained.

Example II

Finely divided zinc and lead containing pyrites and iron-II-sulphate are mixed together in equal parts by weight and are roasted as described in Example I. The further treatment of the roasted product is also shown as described in Example I and the parameters of the product are shown in Table I.

Example III

A flotation pyrite of the type used in Example I is treated as there described with the only difference being that the roasted product is permitted to cool from the roasting temperature of 550°C in air to room temperature. The product properties are shown in Table I. Similar unsatisfactory results are obtained when the hot roasted cinder from mixture of pyrites and iron sulphate are not quenched but are cooled slowly. The table shows that the effect of quenching is especially significant on the viscosity of the drilling mud.

Example IV

Flotation pyrites are prepared with the following proportions of non-ferrous metals:

Pyrite 1 = 0.51 percent by weight zinc and 0.38 percent by weight lead
Pyrite 2 = 1.20 percent by weight zinc
Pyrite 3 = 0.3 percent by weight lead
Pyrite 4 = 0.38 percent by weight zinc and 0.42 by weight lead
Pyrite 5 = 0.12 percent by weight copper and 0.08 percent by weight nickel
Pyrite 6 = 0.25 percent by weight copper
Pyrite 7 = 0.08 percent by weight nickel
Pyrite 8 = 0.20 percent by weight copper and 0.25 percent by weight nickel Pyrite 4 is a mixture of zinc blend and lead sulfide (galena) added to natural pyrite while Pyrite 8 is a mixture of copper and nickel pyrites with normal iron pyrite.

The pyrites 1 through 8 are roasted in a fluidized bed to the compositions set forth in Tables II and III. 2 kg of each of the roasted products is milled in a ball mill and classified to the following particle size range:

54 percent = 30 to 75 microns
12 percent = 20 to 30 microns
13 percent = 20 to 30 microns
21 percent = 0 to 10 microns The classified samples are slurried to a concentration of 500 grams of solids per liter in water and the suspension is agitated at 70°, filtered and washed. The filter cake is slurried with water to a 500 grams per liter concentration and is heated to 70°C. Under agitation 20 grams of barium hydroxide is added to the slurry and permitted to react therewith. The suspension is thereafter filtered, the filter cake is washed and the solid material dried. The composition of the product is given in Tables II and III while Tables IV and V present the technical data obtained when the product is used as a filler for drilling muds. The results shown that non-ferrous metals in amounts below 2 percent highly desirable fillers for drilling muds.

Example V

Pyrites with the following contents of lead, zinc and copper are employed:

Pyrite 9 = 2.1 percent by weight zinc and 1.8 percent by weight lead
Pyrite 10 = 5.2 percent by weight zinc
Pyrite 11 = 1.5 percent by weight copper and 1.2 percent by weight nickel
Pyrite 12 = 4.1 percent by weight copper The pyrite is roasted as described in Example IV and the roasted product is treated as there described. Tables II through V show the result obtained with these pyrites.

Example VI

Pyrites with the following content of zinc, lead, copper and nickel are used in the process of Example IV:

Pyrite 13 = 6.3 percent by weight zinc and 1.8 percent by weight lead
Pyrite 14 = 8.4 percent by weight zinc
Pyrite 15 = 5.8 percent by weight copper and 3.9 percent by weight nickel Pyrite 16 = 7.4 percent nickel The characteristics of the products are shown in Tables II through V.

Example VII

Example VII represents the result obtained, for comparative purposes when commercial baryte with a specific gravity of 4.21 is used in place of the filler of the present invention.

TABLE I

|  | Example I | Example II | Example III |
|---|---|---|---|
| Composition of Final Product | | | |
| % Fe | 61.0 | 75.0 | 61.0 |
| % SiO₂ | 6.0 | 4.0 | 6.0 |
| % Al₂O₃ | 2.0 | 0.6 | 2.0 |
| % S (total) | 0.7 | 0.6 | 0.7 |
| % Cu, Ni | 0.64 | — | 0.64 |
| % Pb, Zn | 0.83 | 1.21 | 0.83 |

TABLE I—Continued

|  | Example I | Example II | Example III |
|---|---|---|---|
| pH measured immediately after manufacture | 7 | 7 | 7 |
| pH measured after 3 months | 7 | 7 | 6 |
| pH measured after 6 months | 7 | 7 | 5 |
| pH measured after 9 months | 7 | 7 | 4 |
| specific gravity | 4.79 | 4.78 | 4.79 |
| Use Data (using a filler stored for 9 months). | | | |
| Fluid with a specific gravity of 1.6. | | | |
| Apparent Viscosity in cP | 26 | 28 | 55 |
| 10 min Gel thickness | 14 | 19 | 43 |
| Thixotropy | 5 | 5 | 36 |
| Dispensibility (time to a constant specific gravity in minutes) | 15 | 14 | 12 |

Viscosity determination by guidelines of Arbeitsausschusses im "WEG," Hannover, June 1968. pH-determination under DIN 53 200.

TABLE II

|  | Example IV Pyrite No. | | | | Example V | | Example VI | |
|---|---|---|---|---|---|---|---|---|
|  | 1 | 2 | 3 | 4 | 9 | 10 | 13 | 14 |
| Analysis of roasted and treated final product: | | | | | | | | |
| % Fe | 59.61 | 59.51 | 59.78 | 59.43 | 57.88 | 56.12 | 52.18 | 51.89 |
| % S | 1.44 | 1.51 | 0.98 | 1.52 | 1.62 | 1.85 | 1.88 | 1.95 |
| % SiO₂ | 5.76 | 5.87 | 4.98 | 5.85 | 5.91 | 5.81 | 5.76 | 5.99 |
| % Al₂O₃ | 2.44 | 2.45 | 2.13 | 2.58 | 2.58 | 2.60 | 2.50 | 2.61 |
| % Zn | 0.51 | 1.20 | — | 0.38 | 2.10 | 5.20 | 6.30 | 8.40 |
| % Pb | 0.38 | — | 0.30 | 0.42 | 1.80 | — | 1.80 | — |
| Watersoluble proportion | | | | | | | | |
| before treatment: | 0.68 | 2.10 | 0.90 | 1.90 | 3.20 | 4.20 | 4.35 | 4.40 |
| after treatment: | 0.07 | 0.08 | 0.06 | 0.08 | 0.09 | 0.10 | 0.10 | 0.11 |
| pH value | | | | | | | | |
| before treatment: | 4 | 3 | 4 | 3 | 3 | 3 | 3 | 3 |
| after treatment: | 7 | 7 | 7 | 7 | 7 | 7 | 7 | 7 |
| specific gravity | 4.80 | 4.73 | 4.83 | 4.78 | 4.77 | 4.72 | 4.75 | 4.70 |

TABLE III

|  | Example IV Pyrite No. | | | | Example V | | Example VI | |
|---|---|---|---|---|---|---|---|---|
|  | 5 | 6 | 7 | 8 | 11 | 12 | 15 | 16 |
| Analysis of roasted and treated final product: | | | | | | | | |
| % Fe | 59.56 | 59.03 | 58.89 | 59.10 | 57.13 | 55.92 | 50.06 | 52.14 |
| % S | 1.43 | 1.67 | 1.38 | 1.56 | 1.62 | 1.86 | 1.96 | 1.79 |
| % SiO₂ | 5.89 | 5.04 | 6.12 | 5.74 | 5.67 | 5.10 | 5.14 | 5.38 |
| % Al₂O₃ | 2.43 | 2.13 | 2.64 | 2.38 | 2.30 | 2.08 | 2.07 | 2.22 |
| % Cu | 0.12 | 0.25 | — | 0.20 | 1.50 | 4.10 | 5.80 | — |
| % Ni | 0.08 | — | 0.08 | 0.25 | 1.20 | — | 3.90 | 7.40 |
| Watersoluble proportion | | | | | | | | |
| before treatment: | 2.01 | 3.40 | 3.50 | 2.90 | 3.40 | 3.90 | 4.10 | 2.80 |
| after treatment: | 0.10 | 0.09 | 0.11 | 0.08 | 0.09 | 0.07 | 0.08 | 0.10 |
| pH Value | | | | | | | | |
| before treatment | 4 | 3 | 3 | 3 | 4 | 3 | 3 | 3 |
| after treatment | 7 | 7 | 7 | 7 | 7 | 7 | 7 | 7 |
| specific gravity | 4.79 | 4.78 | 4.76 | 4.79 | 4.83 | 4.85 | 4.92 | 4.92 |

TABLE IV

| Use Data (Pb- & Zn-containing Pyrite) | Example 4 | Example 5 | Example 6 | Example 7 (Commercial Baryte) |
|---|---|---|---|---|
| Abrasion (mg) | 4 | 9 | 29 | 48 |
| Fluid with a specific gravity of 1.6 | | | | |
| apparent viscosity (cP) | 29 | 38 | 43 | 35 |
| 10 min Gel thickness | 19 | 29 | 33 | 38 |
| Thixotropy | 10 | 9 | 10 | 23 |
| Fluid with a specific gravity of 2.3 | | | | |
| apparent viscosity (cP) | 58 | 63 | 78 | 81 |
| 10 min Gel thickness | 38 | 43 | 52 | 63 |
| Thixotropy | 19 | 20 | 26 | 38 |
| Dispersibility time to a constant specific gravity in minutes | 9 | 13 | 17 | 25 |

Viscosity determination by guidelines of "Richtlinien d. Arbeitsausschusses im Wirtschaftsverband Erdoelgewinnung," Hannover, June 1968.

TABLE V

| Use Data (Cu- & Ni-containing Pyrite) | Example 4 | Example 5 | Example 6 | Example 7 (Commercial Baryte) |
| --- | --- | --- | --- | --- |
| Abrasion (mg) | 5 | 11 | 26 | 48 |
| Fluid with a specific gravity of 1.6 | | | | |
| apparent viscosity (cP) | 25 | 29 | 32 | 35 |
| 10 min. Gel thickness | 19 | 29 | 38 | 38 |
| Thixotropy | 5 | 10 | 19 | 23 |
| Fluid with a specific gravity of 2.3 | | | | |
| apparent viscosity (cP) | 48 | 58 | 66 | 81 |
| 10 min Gel thickness | 29 | 38 | 43 | 63 |
| Thixotropie | 10 | 19 | 29 | 38 |
| Dispersibility | | | | |
| time to a constant specific gravity in minutes | 10 | 12 | 15 | 25 |

Viscosity determination by guidelines of "Richtlinien d. Arbeitsausschusses im Wirtschaftsverband Erdoelgewinnung," Hannover, June 1968.

We claim:

1. A process for producing a filler for drilling fluids, comprising the steps of:

roasting an iron-and-sulphur-containing mineral mass to produce iron oxide solids containing less than 2 percent by weight sulphur;

quenching the roasted solids from a temperature above 200°C in water to a temperature below 100°C;

excluding any oxidizing atmosphere from the roasted solid during the quenching thereof;

leaching and washing the quenched solids with water to remove water soluble components therefrom; and milling and classifying said solids to a particle size distribution below 75 microns, with no more than 50 percent of the particles thereof having a particle size below 10 microns to consititute said filler said solids are classified to a particle size distribution in the ranges of substantially:

50 to 55 percent = 30 to 75 microns 10 to 15 percent = 20 to 30 microns 10 to 15 percent = 10 to 20 microns 20 to 30 percent = up to 10 microns.

2. The process defined in claim 1 wherein said roasted solids are quenched from a temperature of above 350°C.

3. The process defined in claim 2 wherein said mass is roasted at a temperature between 400° and 600°C and is quenched without substantial reduction in temperature before quenching.

4. The process defined in claim 1 wherein said roasted product contains between 0.05 and 10 percent by weight of lead, zinc, copper and/or nickel.

5. The process defined in claim 4 wherein the lead zinc, copper and/or nickel are present in said roasted product in an amount ranging between 0.05 and 6 percent by weight.

6. The process defined in claim 4 wherein said roasted product contains 0.05 to 2 percent by weight lead and or zinc..

7. The process defined in claim 4 wherein said roasted product contains 0.05 to 2 percent by weight copper and/or nickel.

8. The process defined in claim 1 wherein said mass is flotation pyrite.

9. The process defined in claim 1 further comprising the step of treating said solids in aqueous slurry, a barium compound soluble in water.

* * * * *

UNITED STATES PATENT AND TRADEMARK OFFICE
CERTIFICATE OF CORRECTION

PATENT NO. : 3,887,474
DATED : 3 June 1975
INVENTOR(S) : Heinz SENFF, Artur BERGMANN, Gerhard DAM and Dieter MENZEL It is certified that error appears in the above-identified patent and that said Letters Patent are hereby corrected as shown below:

In the heading, line [75], for the first inventor's surname "SENFE" read -- SENFF -- .

Signed and Sealed this thirtieth Day of September 1975

[SEAL]

Attest:

RUTH C. MASON
Attesting Officer

C. MARSHALL DANN
Commissioner of Patents and Trademarks